United States Patent
Zhong et al.

(10) Patent No.: US 10,382,457 B2
(45) Date of Patent: Aug. 13, 2019

(54) ATTACK STREAM IDENTIFICATION METHOD, APPARATUS, AND DEVICE ON SOFTWARE DEFINED NETWORK

(71) Applicant: Huawei Technologies Co., Ltd., Shenzhen (CN)

(72) Inventors: Laijun Zhong, Shenzhen (CN); Xiuchu Zhao, Hangzhou (CN); Kai Qi, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 15/363,047

(22) Filed: Nov. 29, 2016

(65) Prior Publication Data

US 2017/0078313 A1  Mar. 16, 2017

Related U.S. Application Data

(63) Continuation of application No. PCT/CN2014/080096, filed on Jun. 17, 2014.

(51) Int. Cl.
*H04L 29/06* (2006.01)
*H04L 12/717* (2013.01)
(Continued)

(52) U.S. Cl.
CPC .......... *H04L 63/1416* (2013.01); *H04L 29/06* (2013.01); *H04L 45/021* (2013.01);
(Continued)

(58) Field of Classification Search
None
See application file for complete search history.

(56) References Cited

U.S. PATENT DOCUMENTS 8,302,180 B1 * 10/2012 Gudov ............... H04L 63/1408
  726/13
8,635,696 B1 *  1/2014 Aziz .................. H04L 63/1425
  726/23
(Continued)

FOREIGN PATENT DOCUMENTS

CN      1878082 A    12/2006
CN    102487339 A     6/2012
(Continued)

OTHER PUBLICATIONS

"OpenFlow Switch Specification," Open Networking Foundation, Version 1.3.4 (Protocol version 0x04), Mar. 27, 2014, 171 pages.
(Continued)

*Primary Examiner* — Christopher A Revak
(74) *Attorney, Agent, or Firm* — Conley Rose, P.C.

(57) ABSTRACT

An attack stream identification method, apparatus, and device on a software defined network is presented, where an invalid stream filter table is stored in a switch, and the method includes the steps of the switch receives a data packet of a data stream and searches, according to a characteristic value of the data packet, the invalid stream filter table for a state field of a filter entry; when the state field is a suspected attack stream state or a non-attack stream state, the switch sends a report message to a controller, determines a rate value for sending the report message to the controller, and fills the rate value in a rate field of the filter entry; and when the rate value is greater than a preset rate threshold, the switch changes the state field of the filter entry to an attack stream state.

25 Claims, 7 Drawing Sheets

(51) Int. Cl.
*H04L 12/721* (2013.01)
*H04L 12/755* (2013.01)
*H04L 12/801* (2013.01)
*H04L 12/823* (2013.01)

(52) U.S. Cl.
CPC .............. *H04L 45/38* (2013.01); *H04L 47/29* (2013.01); *H04L 63/0245* (2013.01); *H04L 45/42* (2013.01); *H04L 47/32* (2013.01)

(56) References Cited

U.S. PATENT DOCUMENTS

| | | | |
|---|---|---|---|
| 9,525,696 B2* | 12/2016 | Kapoor | H04L 63/1425 |
| 2002/0073175 A1* | 6/2002 | DeKoning | G06F 17/3089 |
| | | | 709/219 |
| 2008/0080518 A1* | 4/2008 | Hoeflin | H04L 63/1416 |
| | | | 370/395.42 |
| 2012/0272308 A1* | 10/2012 | Mishina | H04L 63/0209 |
| | | | 726/11 |
| 2013/0176852 A1 | 7/2013 | Lumezanu et al. | |
| 2013/0329734 A1 | 12/2013 | Chesla et al. | |
| 2014/0040459 A1 | 2/2014 | Agrawal et al. | |
| 2018/0324061 A1* | 11/2018 | Khanal | H04L 43/04 |
| 2018/0324601 A1* | 11/2018 | Barzegar | H04B 7/0617 |

FOREIGN PATENT DOCUMENTS

| | | |
|---|---|---|
| CN | 102946325 A | 2/2013 |
| CN | 103326884 A | 9/2013 |
| CN | 103561011 A | 2/2014 |
| CN | 103607379 A | 2/2014 |
| WO | 2015074451 A1 | 5/2015 |

OTHER PUBLICATIONS

Giotis, K., et al., "Combining OpenFlow and sFlow for an effective and scalable anomaly detection and mitigation mechanism on SDN environments," XP028633283, Computer Networks, Nov. 16, 2012, 16 pages.
Machine Translation and Abstract of Chinese Publication No. CN1878082, Dec. 13, 2006, 10 pages.
Machine Translation and Abstract of Chinese Publication No. CN102487339, Jun. 6, 2012, 18 pages.
Machine Translation and Abstract of Chinese Publication No. CN103561011, Feb. 5, 2014, 17 pages.
Foreign Communication From a Counterpart Application, Chinese Application No. 201480045679.4, Chinese Office Action dated Jan. 23, 2018, 9 pages.
"OpenFlow Switch Specification," Open Networking Foundation, Version 1.3.4 (Protocol version 0x04), Mar. 27, 2014, 171 pages.
Giotis, K., et al., "Combining OpenFlow and sFlow for an effective and scalable anomaly detection and mitigation mechanism on SDN environments," XP028633283, Computer Netwokrs, Nov. 16, 2012, 16 pages.
Mehdi, S., et al., "Revisiting Traffic Anomaly Detection Using Software Defined Networking," XP047372607, Network and Parallel Computing, Sep. 20, 2011, pp. 161-180.
Foreign Communication From a Counterpart Application, European Application No. 14895283.1, Extended European Search Report dated Mar. 17, 2017, 9 pages.
Foreign Communication From a Counterpart Application, PCT Application No. PCT/CN2014/080096, English Translation of International Search Report dated Feb. 27, 2015, 2 pages.
Foreign Communication From a Counterpart Application, PCT Application No. PCT/CN2014/080096, English Translation of Written Opinion dated Feb. 27, 2015, 6 pages.

\* cited by examiner

ATTACK STREAM IDENTIFICATION METHOD, APPARATUS, AND DEVICE ON SOFTWARE DEFINED NETWORK

CROSS-REFERENCE TO RELATED APPLICATIONS

This application is a continuation of International Application No. PCT/CN2014/080096, filed on Jun. 17, 2014, the disclosure of which is hereby incorporated by reference in its entirety.

TECHNICAL FIELD

This application relates to the communications field, and in particular, to an attack stream identification method, apparatus, and device on a software defined network.

BACKGROUND

A software defined network (SDN) is a new network architecture, and compared with internet protocol (IP) route search used in a conventional network, the SDN can implement flexible control over network traffic, so as to provide a desirable platform for innovation of core networks and applications and is a direction of network architecture development in the future.

As shown in FIG. 1, the SDN generally includes two parts: a controller 110 and switches 120. The controller 110 is separately connected to each switch 120 on the network. The switches 120 on the network are topologically connected to each other. The switch 120 on the network may be connected to user equipment 130 and a server 140. When the user equipment 130 needs to perform data communication with the server 140, the controller 110 calculates and obtains a suitable forwarding path between the user equipment 130 and the server 140, and sends a flow entry to a switch 120 on the forwarding path, so that the switch 120 receiving the flow entry can forward data according to the flow entry, and the data communication is completed between the user equipment 130 and the server 140.

If the network is under an illegal attack, the switch 120 receives a large quantity of attack packets, and the controller 110 cannot obtain a suitable forwarding path through calculation. Therefore, the attack packets cannot match with any flow entry in the switch 120. According to an agreement in a current protocol, when receiving a packet having no matching flow entry, the switch 120 needs to send a Packet in message to the controller 110, so that the controller 110 looks for a forwarding path for the packet having no matching flow entry. For example, during an illegal destination IP address, destination addresses of these attack packets do not exist on the network controlled by the controller 110, and therefore the controller 110 cannot find a forwarding path for these packets. Therefore, the controller 110 sends a Packet out message to the switch 120 that sends the Packet in message, where the Packet out message includes an Address Resolution Protocol (ARP) data packet. After receiving the ARP data packet, the switch 120 sends, using ports (except a port through which the attack packets enter), the ARP data packet to switches 120 that are connected to these ports. After receiving the ARP data packet, the switches 120 connected to these ports perform matching between the ARP data packet and flow entries in the switches 120. Destination addresses of the attack packets are fictitious, and therefore the ARP data packet cannot match with any flow entry either. As a result, according to the agreement in the current protocol, these switches 120 send Packet in messages to the controller 110, so that the controller 110 looks for a forwarding path for the packet having no matching flow entry, and then the controller 110 returns Packet out messages. In such a repeated cycle, a topological connection relationship between the switches 120 is relatively complex, and therefore a switch 120 may separately receive, using multiple ports, ARP data packets forwarded by other switches 120, which results in multiple times of flow entry query, greatly wasting resources of the switches 120. In addition, when receiving an ARP data packet using one port, each switch 120 sends a Packet in message to the controller 110 once. Therefore, if receiving an ARP data packet using multiple ports, each switch 120 sends a Packet in message to the controller 110 for multiple times. When multiple switches 120 on the network receive ARP data packets using multiple ports, an amplification effect is caused, where a large quantity of Packet in messages are sent, and this even leads to a broadcast storm finally, which greatly wastes calculation resources of the controller 110 and bandwidth resources of the switches 120.

SUMMARY

This application provides an attack stream identification method, apparatus, and device on a software defined network, which can prevent a broadcast storm caused by an attack stream, and reduce resource waste of a controller and a switch.

A first aspect of this application provides an attack stream identification method on a software defined network, where the software defined network includes a switch and a controller, an invalid stream filter table is stored in the switch, and the attack stream identification method includes the following steps of receiving, by the switch, a data packet of a data stream, and searching, according to a characteristic value of the data packet, the invalid stream filter table for a state field of a filter entry corresponding to the data stream; when the state field is a suspected attack stream state or a non-attack stream state, sending, by the switch, a report message to the controller; determining, by the switch, a rate value for sending the report message to the controller, and filling the rate value in a rate field of the filter entry; and when the rate value is greater than a preset rate threshold, changing, by the switch, the state field of the filter entry to an attack stream state.

With reference to the first aspect, in a first possible implementation manner of the first aspect of this application, the filter entry is created by the switch when the switch receives a first data packet of the data stream, a characteristic value of the first data packet is filled in a match domain field of the filter entry, and the characteristic value is used to identify another data packet of the data stream.

With reference to the first aspect or the first possible implementation manner of the first aspect, in a second possible implementation manner of the first aspect of this application, the method further includes the following steps of determining, by the switch, a duration value for sending the report message to the controller, and filling the duration value in a duration field of the filter entry; when the rate value is less than or equal to the rate threshold, determining, by the switch, whether the duration value is greater than a preset maximum duration value; and when the duration is greater than the preset maximum duration, changing, by the switch, the state field of the filter entry to the suspected attack stream state.

With reference to the second possible implementation manner of the first aspect, in a third possible implementation manner of the first aspect of this application, the method further includes determining, by the switch, a traffic value for sending the report message to the controller, and filling the traffic value in a traffic field of the filter entry; when the duration is less than or equal to the preset maximum duration, determining, by the switch, whether the traffic value is greater than a preset traffic threshold; and if the traffic value is greater than the preset traffic threshold, changing, by the switch, the state field of the filter entry to the suspected attack stream state; or if the traffic value is less than or equal to the preset traffic threshold, changing, by the switch, the state field of the filter entry to the non-attack stream state.

With reference to the second or the third possible implementation manner of the first aspect, in a fourth possible implementation manner of the first aspect of this application, the method further includes, when the state field of the filter entry is changed to the suspected attack stream state, sending, by the switch, the suspected attack stream state to the controller; and receiving, by the switch, a decision result returned by the controller, and determining, according to the decision result, whether to change the state field of the filter entry.

With reference to any one of the second to the fourth possible implementation manners of the first aspect, in a fifth possible implementation manner of the first aspect of this application, the method further includes, when the state field of the filter entry is the suspected attack stream state, reducing, by the switch, a rate for sending the report message to the controller.

With reference to the first aspect, in a sixth possible implementation manner of the first aspect of this application, the method further includes, when the state field is the attack stream state, discarding, by the switch, a subsequent data packet of the data stream.

A second aspect of this application provides an attack stream identification apparatus on a software defined network, where the apparatus includes a receiving module, a sending module, a filling module, and a modification module, where the receiving module is configured to receive a data packet of a data stream, and search, according to a characteristic value of the data packet, an invalid stream filter table for a state field of a filter entry corresponding to the data stream, and the receiving module sends the state field to the sending module; the sending module is configured to receive the state field, and when the state field is a suspected attack stream state or a non-attack stream state, send a report message to a controller; the filling module is configured to determine a rate value for sending the report message to the controller, and fill the rate value in a rate field of the filter entry, and the filling module sends the rate value to the modification module; and the modification module is configured to receive the rate value, and when the rate value is greater than a preset rate threshold, change the state field of the filter entry to an attack stream state.

With reference to the second aspect, in a first possible implementation manner of the second aspect of this application, the filter entry is created by a switch when the switch receives a first data packet of the data stream, a characteristic value of the first data packet is filled in a match domain field of the filter entry, and the characteristic value is used to identify another data packet of the data stream.

With reference to the second aspect or the first possible implementation manner of the second aspect of this application, in a second possible implementation manner of the second aspect of this application, the apparatus further includes a determining module; the filling module is further configured to determine a duration value for sending the report message to the controller, and fill the duration value in a duration field of the filter entry; the determining module is configured to, when the rate value is less than or equal to the rate threshold, determine whether the duration value is greater than a preset maximum duration value; and the modification module is further configured to, when the duration is greater than the preset maximum duration, change the state field of the filter entry to the suspected attack stream state.

With reference to the second possible implementation manner of the second aspect, in a third possible implementation manner of the second aspect of this application, the apparatus further includes a determining module; the filling module is further configured to determine a traffic value for sending the report message to the controller, and fill the traffic value in a traffic field of the filter entry; the determining module is configured to, when the duration is less than or equal to the preset maximum duration, determine whether the traffic value is greater than a preset traffic threshold, and the determining module sends a determining result to the modification module; and the modification module is further configured to receive the determining result, and when the traffic value is less than or equal to the preset traffic threshold, change the state field of the filter entry to the non-attack stream state.

With reference to the second or the third possible implementation manner of the second aspect, in a fourth possible implementation manner of the second aspect of this application, the sending module is further configured to, when the state field of the filter entry is changed to the suspected attack stream state, send the suspected attack stream state to the controller; and the receiving module is further configured to receive a decision result returned by the controller, and determine, according to the decision result, whether to change the state field of the filter entry.

With reference to any one of the second to the fourth possible implementation manners of the second aspect, in a fifth possible implementation manner of the second aspect of this application, the apparatus further includes a reduction module, where the reduction module is configured to, when the state field of the filter entry is the suspected attack stream state, reduce a rate for sending the report message to the controller.

With reference to the second aspect, in a sixth possible implementation manner of the second aspect of this application, the apparatus further includes a discarding module, where the discarding module is configured to, when the state field is the attack stream state, discard a subsequent data packet of the data stream.

A third aspect of this application provides a switch, where the switch includes a receiver, a transmitter, and a processor, where the receiver is configured to receive a data packet of a data stream, and search, according to a characteristic value of the data packet, an invalid stream filter table for a state field of a filter entry corresponding to the data stream; the transmitter is configured to, when the state field is a suspected attack stream state or a non-attack stream state, send a report message to a controller; and the invalid stream filter table is stored in the processor, and the processor is configured to determine a rate value for sending the report message to the controller, fill the rate value in a rate field of the filter entry, and when the rate value is greater than a preset rate threshold, change the state field of the filter entry to an attack stream state.

With reference to the third aspect, in a first possible implementation manner of the third aspect of this application, the filter entry is created by the switch when the switch receives a first data packet of the data stream, a characteristic value of the first data packet is filled in a match domain field of the filter entry, and the characteristic value is used to identify another data packet of the data stream.

With reference to the third aspect or the first possible implementation manner of the third aspect, in a second possible implementation manner of the third aspect of this application, the processor is further configured to determine a duration value for sending the report message to the controller, and fill the duration value in a duration field of the filter entry; when the rate value is less than or equal to the rate threshold, determine whether the duration value is greater than a preset maximum duration value; and when the duration is greater than the preset maximum duration, change the state field of the filter entry to the suspected attack stream state.

With reference to the second possible implementation manner of the third aspect, in a third possible implementation manner of the third aspect of this application, the processor is further configured to determine a traffic value for sending the report message to the controller, and fill the traffic value in a traffic field of the filter entry; when the duration is less than or equal to the preset maximum duration, determine whether the traffic value is greater than a preset traffic threshold; and when the traffic value is greater than the preset traffic threshold, change the state field of the filter entry to the suspected attack stream state; or when the traffic value is less than or equal to the preset traffic threshold, change the state field of the filter entry to the non-attack stream state.

With reference to the second or the third possible implementation manner of the third aspect, in a fourth possible implementation manner of the third aspect of this application, the transmitter is further configured to, when the state field of the filter entry is changed to the suspected attack stream state, send the suspected attack stream state to the controller; the receiver is further configured to receive a decision result returned by the controller; and the processor is further configured to determine, according to the decision result, whether to change the state field of the filter entry.

With reference to any one of the second to the fourth possible implementation manners of the third aspect, in a fifth possible implementation manner of the third aspect of this application, the processor is further configured to, when the state field of the filter entry is the suspected attack stream state, reduce a rate for sending the report message to the controller.

With reference to the first aspect, in a sixth possible implementation manner of the third aspect of this application, the processor is further configured to, when the state field is the attack stream state, discard a subsequent data packet of the data stream.

In the foregoing solutions, after receiving a data packet of a data stream, a switch searches an invalid stream filter table for a state field of a filter entry corresponding to the data stream, and the switch sends a report message to a controller only when the state field is a suspected attack stream state or a non-attack stream state. If the state field is an attack stream state, the switch does not send a report message to the controller. Therefore, a broadcast storm caused by an attack stream is prevented, and resource waste of a controller and a switch is reduced.

BRIEF DESCRIPTION OF DRAWINGS

To describe the technical solutions in the embodiments of the present disclosure or in the prior art more clearly, the following briefly describes the accompanying drawings required for describing the embodiments or the prior art. The accompanying drawings in the following description are some embodiments of the present disclosure.

DESCRIPTION OF EMBODIMENTS

In the following description, to illustrate rather than limit, specific details such as a particular system structure, an interface, and a technology are provided to make a thorough understanding of this application. However, a person skilled in the art should know that this application may be practiced in other implementation manners without these specific details. In other cases, detailed descriptions of well-known apparatuses, circuits, and methods are omitted, so that this application is described without being obscured by unnecessary details.

Figure 1:
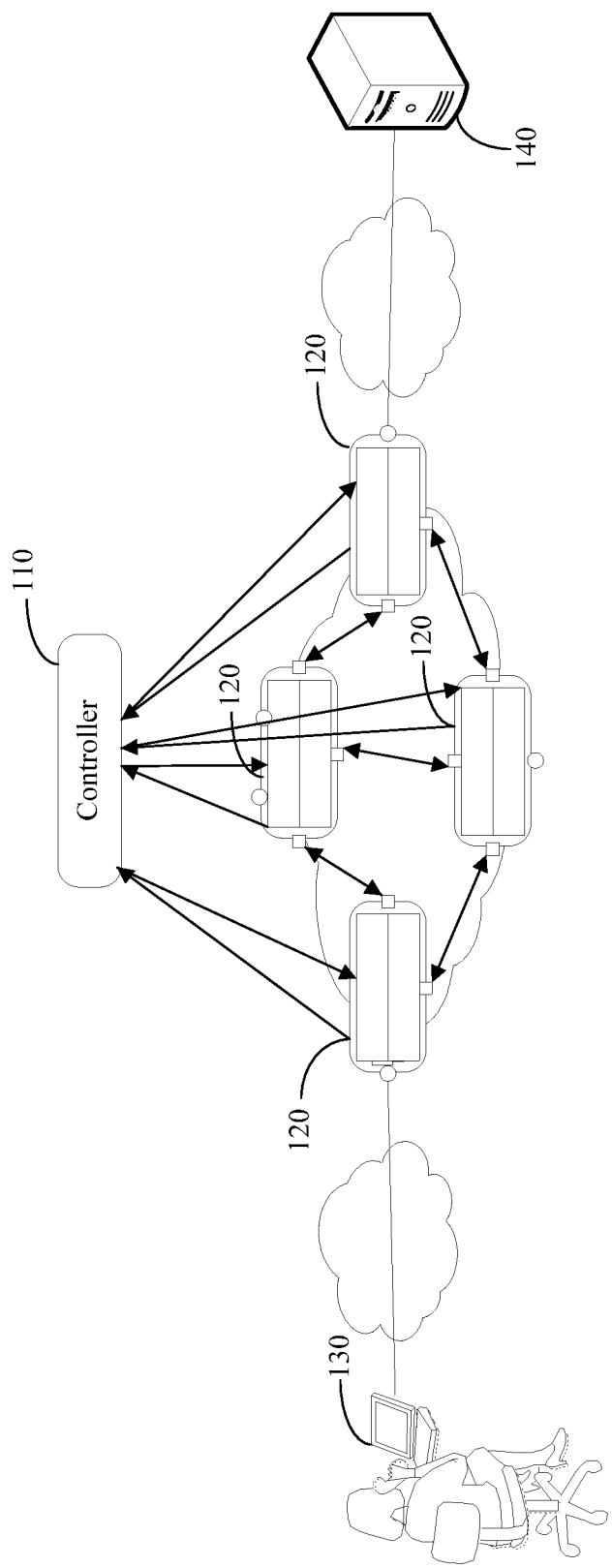
FIG. 1 is a schematic structural diagram of an implementation manner of a software defined network in the prior art.
Figure 2:
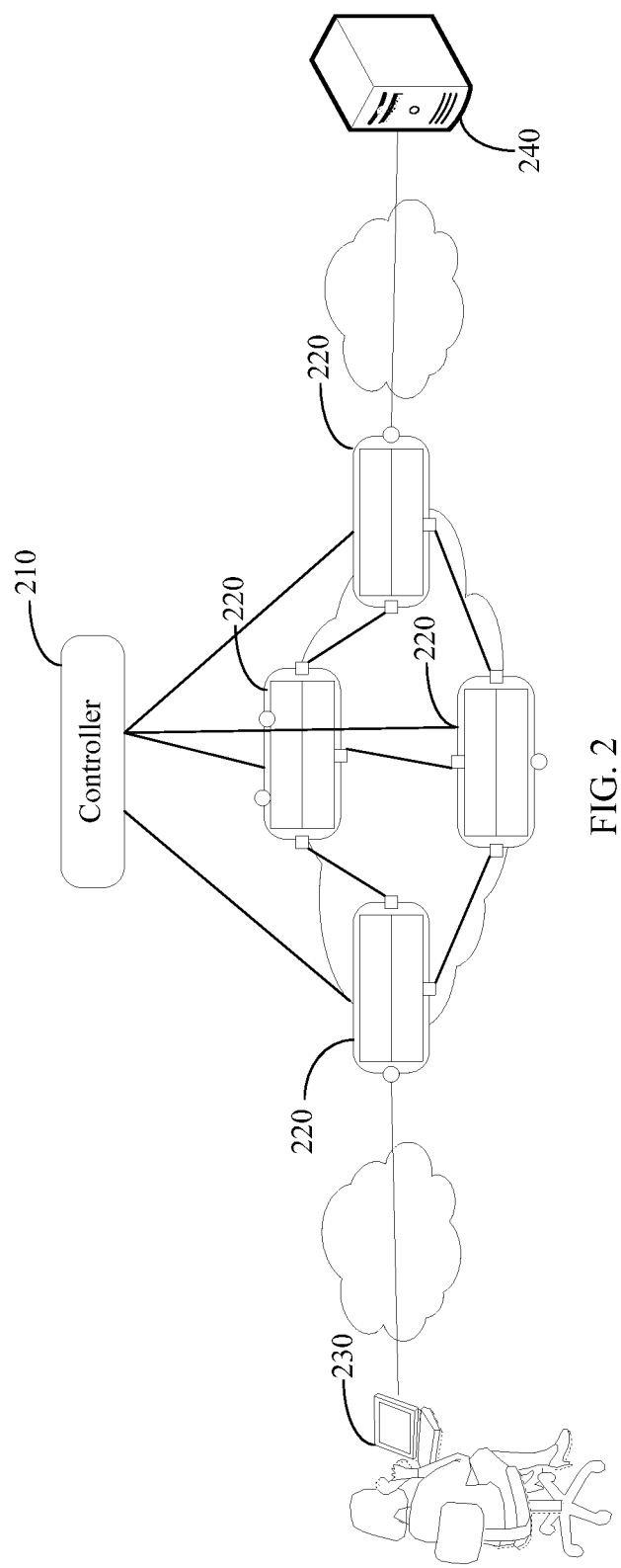
FIG. 2 is a schematic structural diagram of an implementation manner of an attack stream identification system on a software defined network according to this application.

Referring to FIG. 2, FIG. 2 is a schematic structural diagram of an implementation manner of an attack stream identification system on a software defined network according to this application. The attack stream identification system on the software defined network in this implementation manner includes a controller 210 and switches 220. The controller 210 is separately connected to each switch 220 on the network, where the switches 220 on the network are topologically connected to each other. The switch 220 on the network may also be connected to user equipment 230 and a server 240. When the user equipment 230 needs to perform communication with the server 240, the controller 210 obtains a suitable forwarding path between the user equipment 230 and the server 240 through calculation, and sends a flow entry to a switch 220 on the forwarding path, so that the switch 220 receiving the flow entry can forward data according to the flow entry, and the data communication is completed between the user equipment 230 and the server 240.

To be capable of identifying an attack stream before a data transmission channel is established, an invalid stream filter table is set in the switch 220. The invalid stream filter table includes a match domain field, a rate field, a traffic field, a current duration field, and a state field. As shown in Table 1, the match domain field is used to be filled in with a characteristic value, such as an IP address and a port value, of a received data stream. The rate field is used to be filled in with a current rate at which the switch 220 sends a report message to the controller 110. The traffic field is used to be filled in with a current traffic value for sending, by the switch 220, a report message to the controller 110. The current duration field is used to be filled in with current duration for sending, by the switch 220, a report message to the controller 110. The state field is used to be filled in with a status of a data stream, where the status includes a suspected attack stream state, an attack stream state, and a non-attack stream state. Each row is a filter entry of one data stream.

TABLE 1

Invalid stream filter table

| Match domain | Rate value (k/pps) | Traffic value (M/bps) | Current duration (s) | State field |
|---|---|---|---|---|
| Threshold | 5 | 4 | 5 | |
| 192.168.1.1 | 15 | 8 | 10 | Attack stream state |
| 168.142.2.236 | 4 | 5 | 1.2 | Suspected attack stream state |
| 192.168.212.125 | 3 | 2 | 0.67 | Non-attack stream state |
| . . . | . . . | . . . | . . . | . . . |

After receiving a first data packet of the data stream, the switch 220 extracts a characteristic value in the first data packet, then creates a filter entry in the invalid stream filter table according to the extracted characteristic value, and fills in the match domain field of the created filter entry with the extracted characteristic value. A rate threshold, a traffic threshold, and maximum duration are set in the switch 220. The maximum duration is a duration threshold for continuously sending, by the switch 220, the report message to the controller 110. Specially, the rate threshold, the traffic threshold, and the maximum duration may be set in a first row in the invalid stream filter table. The switch 220 encapsulates the first data packet of the data stream into a report message, sends the report message to the controller 110, collects statistics on a current rate value, a current traffic value, and current duration for sending the report message, records the current rate value, the current traffic value, and the current duration in a corresponding filter entry of the invalid stream filter table, determines whether the data stream is an attack packet according to the current rate value, the current traffic value, and the current duration that are recorded, and fills a determining result in the state field of the filter entry. A specific determining process is the same as a method for determining a subsequent packet of the data stream, and details are provided in the following.

When the switch 220 receives another packet of the data stream, the switch 220 first checks the state field of the filter entry that corresponds to the data stream and that is in the invalid stream filter table. If the state field is the suspected attack stream state or the non-attack stream state, the switch 220 sends a report message to the controller 210, and detects a rate value for sending, by the switch 220, the report message to the controller 210. Then, the controller fills the detected rate value of the report message in the rate field of the filter entry. The switch 220 compares the rate value for sending the report message to the controller 210 with the rate threshold in the invalid stream filter table, to determine whether the data stream is an attack stream.

If the rate value for sending the report message is greater than the rate threshold, the data stream is an attack stream, and the switch 220 changes the state field of the filter entry that corresponds to the data stream and that is in the invalid stream filter table to the attack stream state. Then, when the switch 220 receives another packet of the data stream, the switch 220 may directly discard the packet, and does not send the report message to the controller 210 any longer, thereby preventing a broadcast storm caused by the attack stream.

If the rate value for sending the report message is greater than the rate threshold, it may also be confirmed that the data stream is in the suspected attack stream state, and the switch 220 changes the state field of the filter entry that corresponds to the data stream and that is in the invalid stream filter table to the suspected attack stream state, sends the suspected attack stream state to the controller 210, and waits for the controller 210 to return a decision result. In an implementation manner, the suspected attack stream state may be encapsulated into a Packet in message, so that the suspected attack stream state is sent to the controller, as shown in Table 2:

TABLE 2

Format of the Packet in message

| ofp-header | ofp-match | table-id | reason | . . . |

An identifier of the reason field may be set to 3, and the identifier 3 is used to indicate the suspected attack stream state.

If the rate value for sending the report message is less than or equal to the rate threshold, the switch 220 determines a duration value and a traffic value for sending the report message to the controller 210, fills the duration value in the duration field of the filter entry, and fills the traffic value in the traffic field of the filter entry. Then, the switch 220 determines whether the traffic value for sending, by the switch 220, the report message to the controller 210 within the duration exceeds the traffic threshold. If traffic for sending the report message within the duration does not exceed the traffic threshold, but duration for sending the report message exceeds maximum duration, the data stream may be an attack stream, or may be a non-attack stream. Therefore, after the traffic for sending the report message within the duration does not exceed the traffic threshold, but the duration for sending the report message exceeds the maximum duration, the switch 220 changes the state field of the filter entry that corresponds to the data stream and that is in the invalid stream filter table to the suspected attack stream state, sends the suspected attack stream state to the controller 210, and reduces a rate for sending the report message to the controller 210. If the traffic for sending, by the switch 220, the report message to the controller 210 within the duration is greater than the traffic threshold, the data stream may be an attack stream, or may be a non-attack stream; and the switch continues to monitor the traffic within the maximum duration, after the maximum duration is exceeded, the switch 220 sets the state field of the filter entry that corresponds to the data stream and that is in the invalid stream filter table to the suspected attack stream state, sends the suspected attack stream state of the data stream to the controller 210, and then waits for a decision result of the controller 210; the switch may further first reduce the rate for sending the report message to the controller 210, and then sends the report message to the controller 210, which not only can prevent a negative effect that is caused by maintaining an original report rate when the data stream is actually an attack stream, but also can prevent prohibition of reporting due to misjudgment on data that is actually a non-attack stream.

After receiving the suspected attack stream state of the data stream sent by the switch 220, the controller 210 determines whether the data stream is an attack stream, obtains a decision result, and returns the decision result to the switch 220. The decision result may be: it is determined that the data stream is an attack stream, it is determined that the data stream is a non-attack stream, or whether the data stream is an attack stream or a non-attack stream still cannot be determined.

After receiving the decision result of the controller 210, the switch 220 performs a next step of processing on the suspected attack stream according to the decision result. If the decision result is determination that the data stream is an attack stream, the switch 220 changes the state field of the data stream from the suspected attack stream state to the attack stream state. Then, when receiving other packets of the attack stream, the switch 220 directly discards these packets and no longer performs reporting. If the decision result is determination that the data stream is a non-attack stream, the switch 220 changes the state field of the data stream from the suspected attack stream state to the non-attack stream state, and after receiving other packets of the data stream, the switch 220 reports the packets to the controller 210 when checking out that the state field is the non-attack stream state, and no longer detects other packets of the data stream. If the decision result is whether the data stream is an attack stream or a non-attack stream still cannot be determined, the switch 220 may continue to send the report message to repeatedly perform decision until a determinate decision result is obtained, or gives up when time is out.

Figure 3:
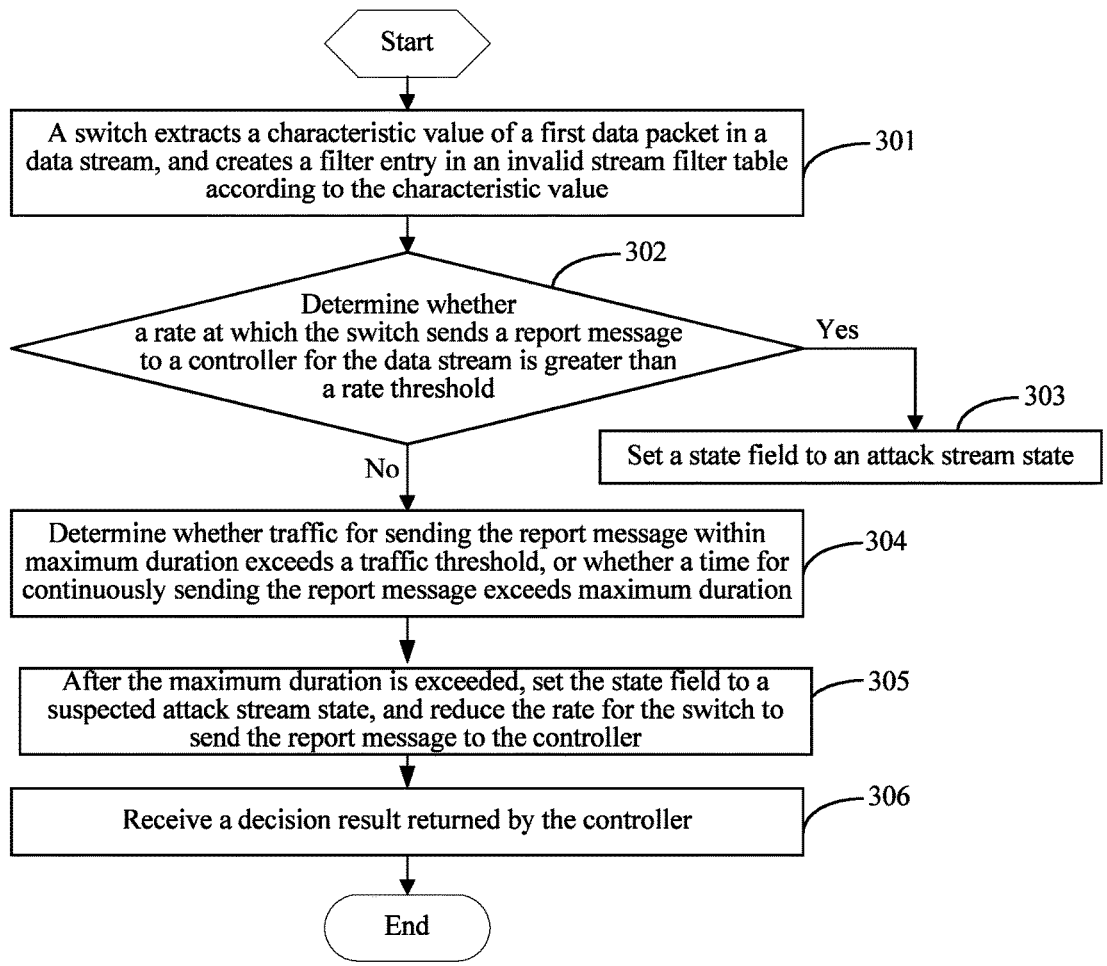
FIG. 3 is a flowchart of a first implementation manner of an attack stream identification method on a software defined network according to this application.

Referring to FIG. 3, FIG. 3 is a flowchart of a first implementation manner of an attack stream identification method on a software defined network according to this application. The attack stream identification method on the software defined network in this implementation manner includes the following steps.

Step 301: A switch extracts a characteristic value of a first data packet in a data stream, and creates a filter entry in an invalid stream filter table according to the characteristic value.

To identify an attack stream before a data transmission channel is established, an invalid stream filter table is set in the switch. The invalid stream filter table includes a match domain field, a rate field, a traffic field, a current duration field, and a state field. The match domain field is used to be filled in with a characteristic value, such as an IP address and a port value, of a received data stream. The rate field is used to be filled in with a current rate at which the switch sends a report message to the controller. The traffic field is used to be filled in with a current traffic value for sending, by the switch, a report message to the controller. The current duration field is used to be filled in with current duration for sending, by the switch, a report message to the controller. The state field is used to be filled in with a status of a data stream, where the status includes a suspected attack stream state, an attack stream state, and a non-attack stream state. Each row is a filter entry of one data stream. For specifics, refer to Table 1.

Types of the foregoing fields may be set by the controller or the switch, and the foregoing fields are only examples of but not limitations on fields in the invalid stream filter table. In other implementation manners, other fields may also be included.

Furthermore, after receiving a first data packet of a data stream, the switch extracts a characteristic value in the first data packet of the data stream, then creates a filter entry in the invalid stream filter table according to the extracted characteristic value, and fills in a match domain field of the created filter entry with the extracted characteristic value. A rate threshold, a traffic threshold, and maximum duration are further set in the switch. The maximum duration is a duration threshold for continuously sending, by the switch, the report message to the controller. Specially, the rate threshold, the traffic threshold, and the maximum duration may be set in a first row in the invalid stream filter table.

Step 302: Detect a rate at which the switch sends a report message to a controller.

When the switch receives another packet of the data stream, the switch first checks the state field of the filter entry that corresponds to the data stream and that is in the invalid stream filter table. If the state field is the suspected attack stream state or the non-attack stream state, the switch sends a report message to the controller, and detects a rate value for sending, by the switch, the report message to the controller. Then, the switch fills the detected rate value for sending the report message in the rate field of the filter entry. The switch compares the rate value for sending the report message to the controller with the rate threshold in the invalid stream filter table, to determine whether the data stream is an attack stream. If it is determined, according to a detection result, that the rate value for sending, by the switch, the report message to the controller is greater than the rate threshold, step 303 is performed. If it is determined, according to a detection result, that the rate value for sending, by the switch, the report message to the controller is less than or equal to the rate threshold, step 304 is performed.

Step 303: Set a state field to an attack stream state. As long as it is detected that the rate value for sending, by the switch, the report message to the controller is greater than the rate threshold, it is determined that the data stream is an attack stream, and the state field of the filter entry that corresponds to the data stream and that is in the invalid stream filter table is changed to the attack stream state. Then, when the switch receives another packet of the data stream, the switch may directly discard the packet, and does not send the report message to the controller any longer, thereby preventing the attack stream from causing a broadcast storm.

Step 304: Determine whether traffic that the switch should use to send the report message to the controller exceeds a traffic threshold within maximum duration, or whether a duration for continuously sending, by the switch, the report message to the controller exceeds maximum duration.

If the rate value for sending, by the switch, the report message to the controller is less than or equal to the preset rate threshold, there exists a case in which the rate at which the switch sends the report message to the controller is relatively high but is less than the rate threshold and the switch continuously sends the report message, and such a data stream cannot be determined as an attack stream when determining is performed on an upload rate. Therefore, after it is determined that the rate at which the switch sends the report message to the controller is less than or equal to the rate threshold, the switch further needs to determine whether traffic of a message reported by the switch to the controller for the data stream exceeds the preset traffic threshold within the preset maximum duration, or whether the duration during which the switch continuously sends the report message to the controller exceeds the maximum duration.

Step 305: After the maximum duration is exceeded, set the state field to a suspected attack stream state, and reduce the rate at which the switch sends the report message to the controller. If the traffic threshold is not exceeded within the maximum duration but the duration for sending the report message exceeds the maximum duration, the data stream may be an attack stream, or may be a non-attack stream. Therefore, after the maximum duration is exceeded, the state field is set to the suspected attack stream state, the suspected attack stream state is sent to the controller, and the rate at which the switch sends the report message to the controller is reduced.

Although the rate value for sending, by the switch, the report message to the controller is less than or equal to the rate threshold, if the traffic for sending, by the switch, the report message to the controller is greater than the traffic threshold within the maximum duration, the data stream may also be an attack stream. Therefore, within the maximum duration, the switch continues to monitor the traffic, and after the switch detects that the duration for sending the report message to the controller exceeds the maximum duration, the state field of the filter entry that corresponds to the data stream and that is in the invalid stream filter table is set to the suspected attack stream state. Besides, because on the software defined network, only the controller can determine whether the data stream is an attack stream, after it is determined that the data stream is a suspected attack stream, the switch sends the suspected attack stream state of the data stream to the controller, and waits for the controller to return a decision result. In a waiting process, the switch continues to send the report message to the controller. In an implementation manner, the suspected attack stream state may be encapsulated into a Packet in message, so that the suspected attack stream state is sent to the controller.

In this case, the switch is not sure whether the data stream is an attack stream, and if it finally turns out that the data stream is actually an attack stream, to continue to use the original report rate may cause a waste of switch resources, or if it finally turns out that the data stream is actually a non-attack stream, to stop sending the report message by the switch causes very poor user experience. Therefore, the report message is reported to the controller only after the rate at which the switch sends the report message to the controller is reduced, which not only prevents a negative effect caused by maintaining the original report rate when the data stream is actually an attack stream, but also can prevent prohibition of reporting due to misjudgment on data that is actually a non-attack stream.

Figure 4:
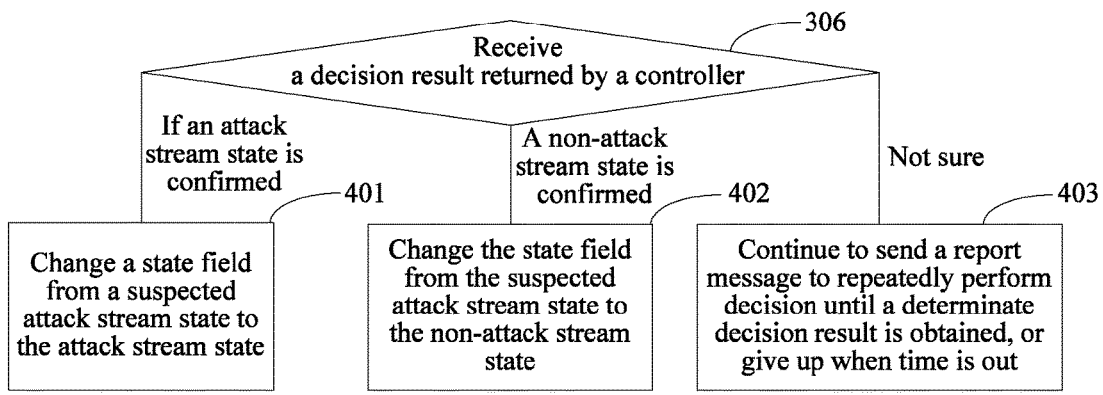
FIG. 4 is a partial detailed flowchart of the attack stream identification method on the software defined network shown in FIG. 3.

Step 306: Receive a decision result returned by the controller. After the controller obtains the decision result by means of determining on the suspected attack stream, and returns the decision result to the switch, the switch receives the decision result, and performs a next step of processing on the suspected attack stream according to the decision result. Refer to FIG. 4.

As shown in FIG. 4, FIG. 4 is a partial detailed flowchart of the attack stream identification method on the software defined network shown in FIG. 3. That is, FIG. 4 is a further detailed description of step 306 in FIG. 3. If the decision result received by the switch is that it is determined that the data stream is an attack stream, step 401 is performed. If the decision result received by the switch is confirmation that the data stream is a non-attack stream, step 402 is performed.

If the decision result is whether the data stream is an attack stream or a non-attack stream cannot be determined, step 403 is performed.

Step 401: Change the state field from the suspected attack stream state to the attack stream state. The switch may directly discard the data stream, and does not send the report message any longer, thereby preventing the attack stream from causing a broadcast storm.

Step 402: Change the state field from the suspected attack stream state to the non-attack stream state. Therefore, when receiving another packet of the data stream, the switch does not monitor the another packet of the data stream.

Step 403: Continue to send the report message to repeatedly perform decision until a determinate decision result is obtained, or give up when time is out.

Different from the prior art, in this implementation manner, an invalid stream filter table is created in a switch, if for a data stream, a rate value for sending, by the switch, a report message is greater than a rate threshold, a state field corresponding to the data stream is set to an attack stream state, and when receiving another packet of the data stream, the switch may directly discard the packet and does not send the report message any longer, thereby preventing a broadcast storm caused by an attack stream. When the rate for sending the report message is less than or equal to the rate threshold, it is further determined whether traffic for sending, by the switch, the report message to a controller exceeds a traffic threshold within maximum duration. If a determining result is that the traffic for sending, by the switch, the report message to the controller exceeds the traffic threshold within the maximum duration, or the traffic does not exceed the traffic threshold within the maximum duration but a duration for sending the report message exceeds the maximum duration, after the maximum duration is exceeded, the state field is set to a suspected attack stream state, and the rate at which the switch sends the report message to the controller is reduced, thereby reducing impact of an amplification effect. In addition, after the switch sends the suspected attack stream state to the controller, if a decision result returned by the controller is confirmation that the data stream is in the attack stream state, the state field is changed from the suspected attack stream state to the attack stream state, and when receiving another packet of the data stream, the switch may directly discard the packet and does not send the report message, thereby preventing a broadcast storm caused by the attack stream; or if a decision result returned by the controller is confirmation that the data stream is in a non-attack stream state, the state field is changed from the suspected attack stream state to the non-attack stream state, and when receiving another packet of the data stream, the switch does not need to monitor the data stream any longer, thereby increasing the processing efficiency to a normal rate.

Figure 5:
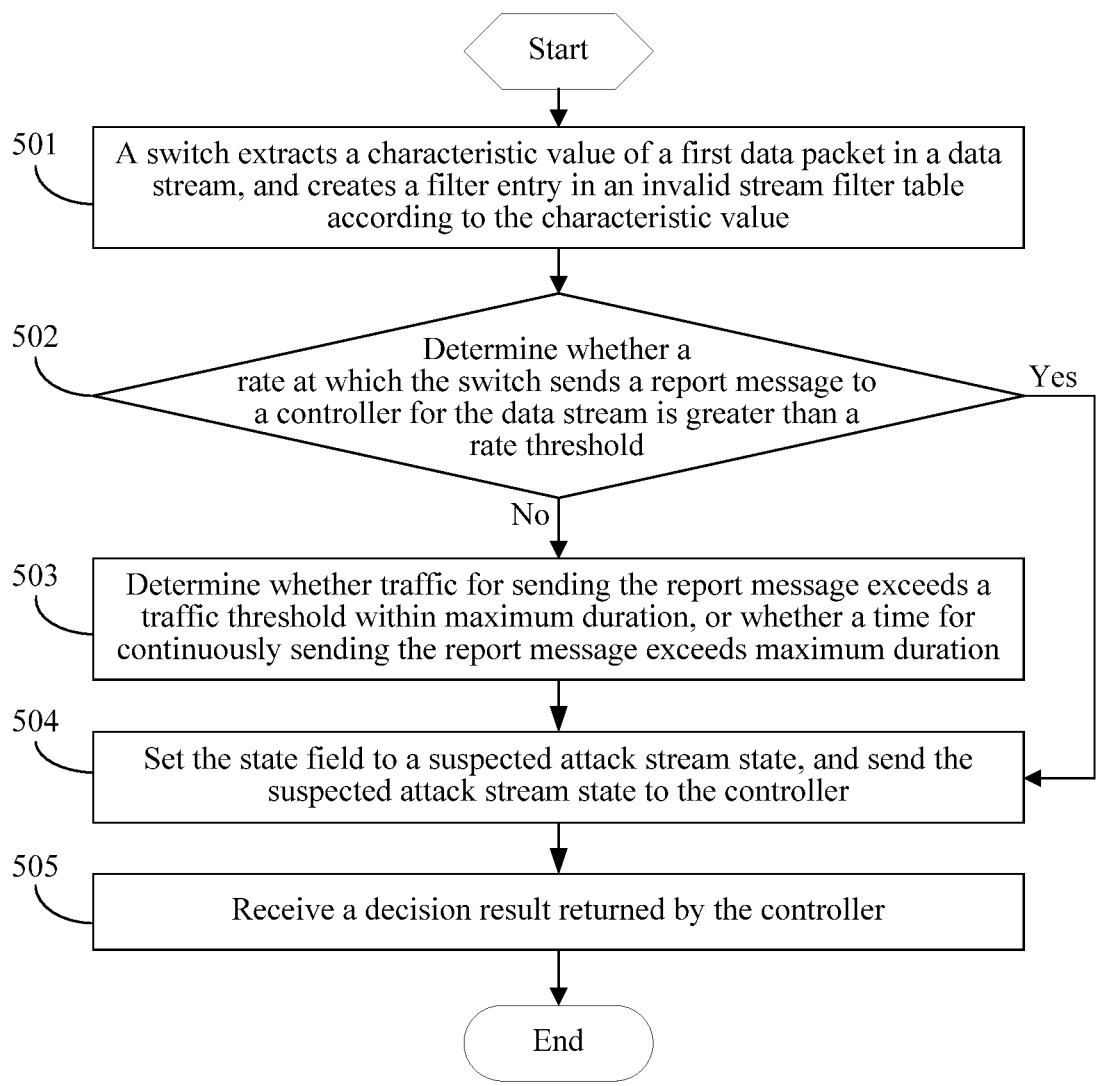
FIG. 5 is a flowchart of a second implementation manner of an attack stream identification method on a software defined network according to this application.

In another implementation manner, as shown in FIG. 5, FIG. 5 is a flowchart of a second implementation manner of an attack stream identification method on a software defined network according to this application. Step 501 and step 503 in this implementation manner are respectively the same as step 301 and step 304 in the previous implementation manner, and details are not described herein. This implementation manner differs from the previous implementation manner in that, if a detection result in step 502 is that the rate value for sending, by the switch, the report message to the controller is greater than the rate threshold, step 504 is performed: Set the state field to a suspected attack stream state, and send the suspected attack stream state to the controller. Then, the switch waits for the controller to return a decision result, continues to send the report message to the controller for the data stream, and reduces the rate at which the switch sends the report message to the controller. The switch receives a decision result returned from the controller in step 505.

Compared with the previous implementation manner, in this implementation manner, when it is detected that the rate value for sending, by the switch, the report message to the controller is greater than the rate threshold, the state field of the data stream is set to the suspected attack stream state, which can prevent a phenomenon that some non-attack streams are mistaken as attack streams due to temporary high-rate transmission, making a determining result more accurate.

Figure 6:
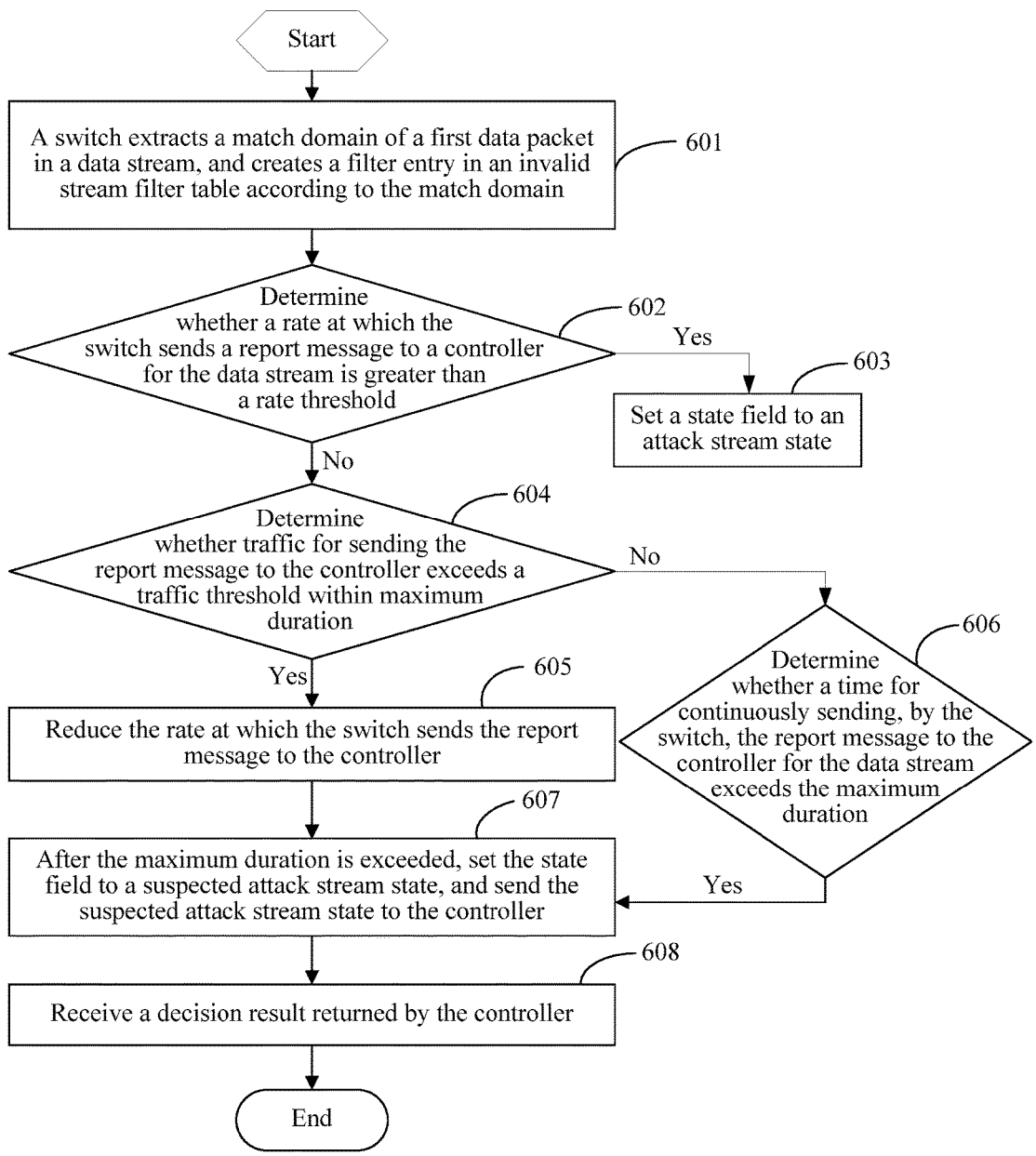
FIG. 6 is a flowchart of a third implementation manner of an attack stream identification method on a software defined network according to this application.

Referring to FIG. 6, FIG. 6 is a flowchart of a third implementation manner of an attack stream identification method on a software defined network according to this application. The method includes the following steps.

Step 601: A switch extracts a characteristic value of a first data packet in a data stream, and creates a filter entry in an invalid stream filter table according to the characteristic value.

To implement identification of an attack stream, an invalid stream filter table is set in the switch.

A match domain field, a rate field, a traffic field, a current duration field, and a state field are defined in the invalid stream filter table. The match domain field is used to be filled in with a characteristic value, such as an IP multi-tuple and a port value, of a received data stream. The rate field is used to fill in a current rate for a report message. The traffic field is used to be filled in with a current traffic value of the data stream. The current duration field is used to be filled in with current duration of the data stream. The state field is used to be filled in with a status of the data stream, where the status includes a suspected attack stream state, an attack stream state, and a non-attack stream state. Initially, all state fields are set to the non-attack stream state by default.

Types of the foregoing fields may be set by the controller or the switch, and the foregoing fields are only examples of but not limitations on fields in the invalid stream filter table. In other implementation manners, other fields may also be included.

Furthermore, after receiving the first data packet of the data stream, the switch extracts a characteristic value in the first data packet of the data stream before reporting the first data packet of the data stream to the controller, then creates a filter entry in the invalid stream filter table according to the extracted characteristic value, and fills in a match domain field of the created filter entry with the extracted characteristic value. A rate threshold, a traffic threshold, and maximum duration are further set in the switch. The maximum duration is a duration threshold for continuously sending, by the switch, the report message. Specially, the rate threshold, the traffic threshold, and the maximum duration may be set in a first row in the invalid stream filter table.

Step 602: Detect a rate at which the switch sends a report message to a controller.

When the switch receives another packet of the data stream, the switch detects the state field that corresponds to the data stream and that is in the invalid stream filter table. If the state field is the suspected attack stream state or the non-attack stream state, the switch sends a report message to the controller, detects a rate value for sending, by the switch, the report message to the controller. Then, the switch fills the detected rate value for sending the report message in the rate field of the filter entry. The switch compares the rate value for sending the report message to the controller with the rate threshold in the invalid stream filter table, to determine whether the data stream is an attack stream. If it is determined, according to a detection result, that the rate value for sending, by the switch, the report message to the controller is greater than the rate threshold, step 603 is performed. If it is determined, according to a detection result, that the rate value for sending, by the switch, the report message to the controller is less than or equal to the rate threshold, step 604 is performed.

In another implementation manner, if the rate value for sending the report message is greater than the rate threshold, it may also be determined that the data stream is in the suspected attack stream state, the state field of the filter entry that corresponds to the data stream and that is in the invalid stream filter table is set to the suspected attack stream state, the suspected attack stream state is sent to the controller, and a decision result of the controller is waited for.

Step 603: Set a state field to an attack stream state. As long as it is detected that the rate value for sending, by the switch, the report message to the controller is greater than the rate threshold, it is determined that the data stream is an attack stream, and the state field of the filter entry that corresponds to the data stream and that is in the invalid stream filter table is set to the attack stream state. Then, when the switch receives another packet of the data stream, the switch may directly discard the packet, and does not send the report message any longer, thereby preventing the attack stream from causing a broadcast storm.

Step 604: Determine whether traffic that the switch should use to send the report message to the controller for the data stream exceeds a traffic threshold within maximum duration.

If the rate at which the switch sends the report message to the controller is less than or equal to the preset rate threshold, there exists a case in which the rate at which the switch sends the report message to the controller is relatively high but is less than the rate threshold and the switch continuously sends the report message, and such a data stream cannot be determined as an attack stream when determining is performed on an upload rate. Therefore, after it is determined that the rate at which the switch sends the report message to the controller is less than or equal to the rate threshold, the switch further needs to determine whether traffic of a message that is reported by the switch to the controller for the data stream exceeds the preset traffic threshold within the preset maximum duration. If the switch determines that the traffic for sending, by the switch, the report message to the controller for the data stream does not exceed the traffic threshold within the maximum duration, step 606 is performed. If the switch determines that the traffic for sending, by the switch, the report message to the controller exceeds the traffic threshold within the maximum duration, step 605 is performed.

Step 605: When the traffic for sending, by the switch, the report message to the controller exceeds the traffic threshold within the maximum duration, immediately reduce a rate at which the switch sends the report message to the controller.

If the switch determines that the traffic of the data stream already exceeds the traffic threshold but an upload duration does not reach the maximum duration, that is, the traffic already exceeds the traffic threshold within the maximum duration, within a period after the traffic exceeds the traffic threshold and before the upload duration reaches the maximum duration, the switch is not sure whether the data stream is an attack stream. If it finally turns out that the data stream is actually an attack stream, to continue to use the original report rate may cause a waste of switch resources. If it finally turns out that the data stream is actually a non-attack stream, to forbid the switch to send the report message causes very poor user experience. Therefore, the rate at which the switch sends the report message to the controller is reduced. Then, step 606 is performed.

Step 606: Determine whether a duration for continuously sending, by the switch, the report message to the controller exceeds the maximum duration.

If the traffic for sending the report message does not exceed the traffic threshold, but the duration for sending the report message exceeds the maximum duration, the data stream may also be an attack stream. Therefore, whether the duration during which the switch continuously sends the report message to the controller exceeds the maximum duration needs to be determined. Then, step 607 is performed. In another aspect, even if the traffic for sending, by the switch, the report message to the controller exceeds the traffic threshold within the maximum duration, step 607 should not be performed until the maximum duration is exceeded.

Step 607: Set the state field to a suspected attack stream state, and send the suspected attack stream state to the controller.

Although the rate value for sending, by the switch, the report message to the controller is less than or equal to the rate threshold, if the traffic for sending, by the switch, the report message to the controller is greater than the traffic threshold within the maximum duration, the data stream may also be an attack stream. Therefore, within the maximum duration, the switch continues to monitor the traffic, and after the duration for sending, by the switch, the report message to the controller exceeds the maximum duration, the state field of the filter entry that corresponds to the data stream and that is in the invalid stream filter table is set to the suspected attack stream state.

Although the traffic threshold is not exceeded within the maximum duration, if a duration value for sending the report message exceeds the maximum duration, the data stream may also be an attack stream. Therefore, after the maximum duration is exceeded, the state field is set to the suspected attack stream state, the suspected attack stream state is sent to the controller, and the rate at which the switch sends the report message to the controller is reduced.

Besides, because on the software defined network, only the controller can determine whether the data stream is an attack stream, after it is determined that the data stream is a suspected attack stream, the switch sends the suspected attack stream state of the data stream to the controller, waits for the controller to return a decision result, and continues to send the report message to the controller.

Step 608: Receive a decision result returned by the controller.

After the controller obtains the decision result by means of determining on the suspected attack stream, and returns the decision result to the switch, the switch receives the decision result, and performs a next step of processing on the suspected attack stream according to the decision result. If the decision result received by the switch is confirmation that the data stream is an attack stream, the state field is changed from the suspected attack stream state to the attack stream state. The switch may directly discard the data stream that is determined as an attack stream, and does not send the report message any longer, thereby preventing the attack stream from causing a broadcast storm. If the decision result received by the switch is confirmation that the data stream is a non-attack stream, the state field is changed from the suspected attack stream state to the non-attack stream state, and after receiving another packet of the data stream, the switch does not monitor the another packet of the data stream any longer. If the decision result is whether the data stream is an attack stream or a non-attack stream still cannot be determined, the switch 220 continues to send the report message to repeatedly perform decision until a determinate decision result is obtained, or gives up when time is out.

In the foregoing solution, after receiving a data packet of a data stream, a switch searches an invalid stream filter table for a state field of a filter entry corresponding to the data stream, and the switch sends a report message to a controller only when the state field is a suspected attack stream state or a non-attack stream state. If the state field is an attack stream state, the switch does not send a report message to the controller. Therefore, a broadcast storm caused by an attack stream is prevented, and resource waste of a controller and a switch is reduced.

Figure 7:
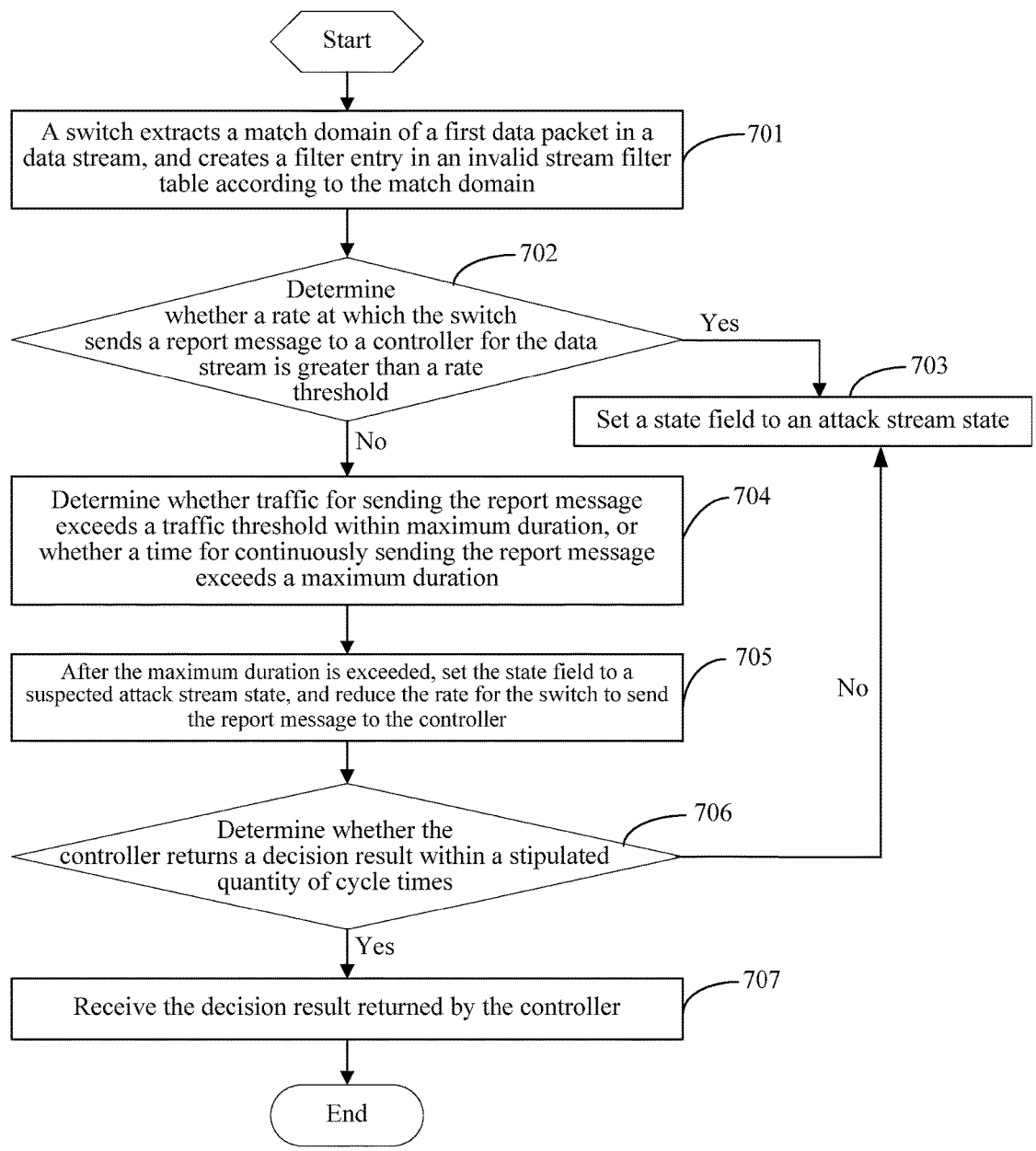
FIG. 7 is a flowchart of a fourth implementation manner of an attack stream identification method on a software defined network according to this application.

In another implementation manner, as shown in FIG. 7, FIG. 7 is a flowchart of a fourth implementation manner of an attack stream identification method on a software defined network according to this application. Step 701 to step 705 in the attack stream identification method on the software defined network in this implementation manner are respectively the same as step 301 to step 305 in the implementation manner shown in FIG. 3, and a difference from the implementation manner shown in FIG. 3 is that after step 705 of setting the state field to a suspected attack stream state and sending the suspected attack stream state to the controller after duration for sending, by the switch, the report message to the controller exceeds the maximum duration, the method further includes the following steps.

Step 706: The switch determines whether the controller returns a decision result within a stipulated quantity of cycle times.

After the switch sends the suspected attack stream state of the data stream to the controller, when the controller cannot quickly return confirmation information or the controller cannot return control information because the controller may be incapable of identifying some attack streams, or because an attack target of an attack stream is the controller, or due to other causes, to prevent an amplification effect, a duration in which the switch waits for the controller to return the decision result needs to be limited. If it is determined that the controller returns the decision result to the switch within a stipulated time, step 707 is performed. If within a stipulated time, the switch does not receive the decision result sent by the controller, step 704 is performed to determine whether the traffic for sending the report message to the controller exceeds the traffic threshold or whether a duration for continuously sending the report message exceeds the maximum duration. The foregoing process is repeatedly performed, until the decision result returned by the controller is received within the preset quantity of cycle times, or after the quantity of cycle times is exceeded, the state field of the filter entry that corresponds to the data stream and that is in the invalid stream filter table is set from the suspected attack stream state to the attack stream state again.

Step 707: Receive the decision result returned by the controller. If the decision result received by the switch is confirmation that the data stream is an attack stream, the state field is changed from the suspected attack stream state to the attack stream state. The switch may directly discard the data stream, and does not send the report message any longer, thereby preventing the attack stream from causing a broadcast storm. If the decision result received by the switch is confirmation that the data stream is a non-attack stream, the state field is changed from the suspected attack stream state to the non-attack stream state. Therefore, when receiving another packet of the data stream, the switch does not monitor the another packet of the data stream. If the decision result is whether the data stream is an attack stream or a non-attack stream cannot be determined, the switch 220 continues to send the report message to repeatedly perform decision until a determinate decision result is obtained, or gives up when time is out.

A difference between this implementation manner and the implementation manner shown in FIG. 3 lies in that, after a suspected attack stream state of a data stream is sent to a controller and a decision result of the controller is not received within a stipulated time, it is repeatedly determined whether a traffic value for sending, by a switch, a report message to the controller exceeds a traffic threshold within maximum duration or whether duration in which a switch continuously sends a report message to the controller exceeds maximum duration. If the traffic value for sending, by the switch, the report message to the controller does not exceed the traffic threshold within the maximum duration, and the duration in which the switch continuously sends the report message to the controller does not exceed the maximum duration, a state of the data stream is changed to a non-attack stream state, and when receiving another packet of the data stream, the switch does not need to monitor the data stream any longer, thereby increasing the processing efficiency. If the traffic value exceeds the traffic threshold or the duration exceeds the maximum duration, the suspected attack stream state of the data stream is maintained, the switch continues to perform reporting to the controller, and then waits for a decision result of the controller. The foregoing process is repeatedly performed. If the switch receives the decision result of the controller within a stipulated quantity of cycle times, the switch performs a next step of processing on the data stream. If the switch does not receive the decision result of the controller after a quantity of repetition times exceeds the stipulated quantity of cycle times, the switch changes the state of the data stream to the attack stream state, and directly discards the data stream, which saves resources of the controller and the switch, and prevents an attack stream from causing a broadcast storm.

Figure 8:
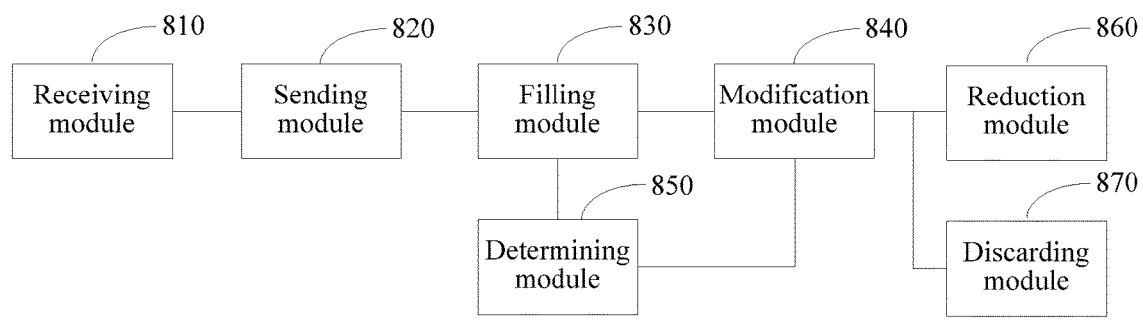
FIG. 8 is a schematic structural diagram of an implementation manner of an attack stream identification apparatus on a software defined network according to this application.

As shown in FIG. 8, FIG. 8 is a schematic structural diagram of an implementation manner of an attack stream identification apparatus on a software defined network according to this application. The attack stream identification apparatus on the software defined network in this implementation manner includes a receiving module 810, a sending module 820, a filling module 830, a modification module 840, a determining module 850, a reduction module 860, and a discarding module 870.

The receiving module 810 is configured to receive a data packet of a data stream, and search, according to a characteristic value of the data packet, an invalid stream filter table for a state field of a filter entry corresponding to the data stream, and the receiving module 810 sends the state field to the sending module 820. The sending module 820 is configured to receive the state field, and when the state field is a suspected attack stream state or a non-attack stream state, send a report message to a controller. The filling module 830 is configured to determine a rate value for sending the report message to the controller, and fill the rate value in a rate field of the filter entry, and the filling module 830 sends the rate value to the modification module 840. The modification module 840 is configured to receive the rate value, and when the rate value is greater than a preset rate threshold, change the state field of the filter entry to an attack stream state.

Optionally, the filter entry is created by a switch when the switch receives a first data packet of the data stream, a characteristic value of the first data packet is filled in a match domain field of the filter entry, and the characteristic value is used to identify another data packet of the data stream.

Optionally, the filling module 830 is further configured to determine a duration value for sending the report message to the controller, and fill the duration value in a duration field of the filter entry. The determining module 850 is configured to, when the rate value is less than or equal to the rate threshold, determine whether the duration value is greater than a preset maximum duration value. The modification module 840 is further configured to, when the duration is greater than the preset maximum duration, change the state field of the filter entry to the suspected attack stream state.

Optionally, the filling module 830 is further configured to determine a traffic value for sending the report message to the controller, and fill the traffic value in a traffic field of the filter entry; the determining module 850 is configured to, when the duration is less than or equal to the preset maximum duration, determine whether the traffic value is greater than a preset traffic threshold, and the determining module 850 sends a determining result to the modification module 840; and the modification module 840 is further configured to receive the determining result, and when the traffic value is less than or equal to the preset traffic threshold, change the state field of the filter entry to the non-attack stream state.

Optionally, the sending module 820 is further configured to, when the state field of the filter entry is changed to the suspected attack stream state, send the suspected attack stream state to the controller; and the receiving module 810 is further configured to receive a decision result returned by the controller, and determine, according to the decision result, whether to change the state field of the filter entry.

Optionally, the reduction module 860 is configured to, when the state field of the filter entry is the suspected attack stream state, reduce a rate for sending the report message to the controller.

Optionally, the discarding module 870 is configured to, when the state field is the attack stream state, discard a subsequent data packet of the data stream.

It may be understood that, the apparatus shown in FIG. 8 may perform the steps in the embodiments corresponding to FIG. 3, FIG. 5, FIG. 6, and FIG. 7.

Different from the prior art, in this implementation manner, an invalid stream filter table is created in a switch, if for a data stream, a rate value for sending, by the switch, a report message is greater than a rate threshold of the data stream, a state field corresponding to the data stream is set to an attack stream state, and when receiving another packet of the data stream, the switch may directly discard an attack packet and does not send the report message any longer, thereby preventing a broadcast storm caused by an attack stream. When the rate value for sending the report message is less than or equal to the rate threshold, it is further determined whether traffic for sending, by the switch, the report message to the controller exceeds a traffic threshold within maximum duration. If a determining result is that the traffic for sending, by the switch, the report message to the controller exceeds the traffic threshold within the maximum duration, or the traffic does not exceed the traffic threshold within the maximum duration but a duration for sending the report message exceeds the maximum duration, after the maximum duration is exceeded, the state field is set to a suspected attack stream state, and a rate at which the switch sends the report message to the controller is reduced, thereby reducing impact of an amplification effect. In addition, after the switch sends the suspected attack stream state to the controller, if a decision result returned by the controller is that the attack stream state is confirmed, the state field is changed from the suspected attack stream state to the attack stream state, and when receiving another attack packet of the data stream, the switch may directly discard the attack packet and does not send the report message, thereby preventing a broadcast storm caused by the attack stream; or if a decision result returned by the controller is that a non-attack stream state is confirmed, the state field is changed from the suspected attack stream state to the non-attack stream state, and when receiving another packet of the data stream, the switch does not need to monitor the data stream any longer, thereby increasing the processing efficiency to a normal rate.

Figure 9:
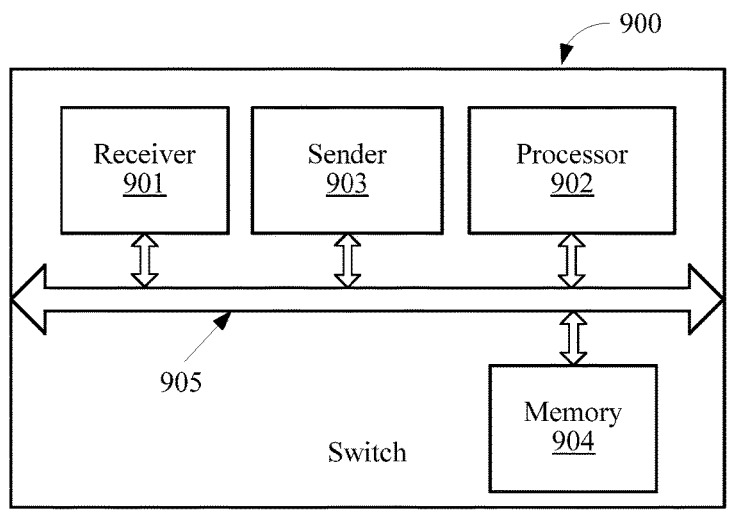
FIG. 9 is a schematic structural diagram of an implementation manner of a switch according to this application.

As shown in FIG. 9, FIG. 9 is a schematic structural diagram of an implementation manner of a switch according to this application. In this implementation manner, the switch 900 includes a receiver 901, a processor 902, and a transmitter 903.

The receiver 901 is configured to receive a data packet of a data stream, and search, according to a characteristic value of the data packet, an invalid stream filter table for a state field of a filter entry corresponding to the data stream; the transmitter 903 is configured to, when the state field is a suspected attack stream state or a non-attack stream state, send a report message to a controller; and the invalid stream filter table is stored in the processor 902, and the processor 902 is configured to determine a rate value for sending the report message to the controller, fill the rate value in a rate field of the filter entry, and when the rate value is greater than a preset rate threshold, change the state field of the filter entry to an attack stream state.

The switch in this implementation manner further includes a memory 904, where the memory 904 may include a read-only memory and a random access memory, and provides an instruction and data to the processor 902. A part of the memory 904 may further include a non-volatile random access memory (NVRAM).

The memory 904 stores the following elements, executable modules or data structures, or a subset thereof, or an extension set thereof: operation instructions including various operation instructions, used to implement various operations; and an operating system including various system programs, used to implement various fundamental services and process a hardware-based task.

In this embodiment of the present disclosure, the processor 902 executes the foregoing operations by invoking the operation instructions (where the operation instructions may be stored in the operating system) stored in the memory 904.

The processor 902 may also be referred to as a central processing unit (CPU). The memory 904 may include a read-only memory and a random access memory, and provides instructions and data to a processor 1002. A part of the memory 904 may further include a NVRAM. In a specific application, components of the controller 905 are coupled using a bus system 905, and the bus system 905 may further include a power bus, a control bus, a status signal bus, and the like, in addition to a data bus. However, for the clarity of the description, various buses in the figure are denoted as the bus system 905.

The methods disclosed in the foregoing embodiments of the present disclosure may be applied to the processor 902, or are implemented by the processor 902. The processor 902 may be an integrated circuit chip, and has a signal processing capability. In an implementation process, steps of the foregoing methods may be accomplished using an integrated logic circuit of hardware in the processor 902 or an instruction in a form of software. The processor 902 may be a general purpose processor, a digital signal processor (DSP), an application-specific integrated circuit (ASIC), a field programmable gate array (FPGA), or another programmable logic device, discrete gate or transistor logical device, and discrete hardware component. The processor 502 may implement or execute methods, steps, and logical block diagrams disclosed in the embodiments of the present disclosure. The general purpose processor may be a microprocessor, or the processor may be any conventional processor, or the like. Steps of the methods disclosed with reference to the embodiments of the present disclosure may be directly executed and completed by a hardware decoding processor, or may be executed and completed using a combination of hardware and software modules in the decoding processor. The software module may be located in a mature storage medium such as a random access memory, a flash memory, a read-only memory, a programmable read-only memory, an electrically-erasable programmable memory or a register in the field. The storage medium is located in the memory 904. The processor 902 reads information in the memory 904, and completes the steps of the foregoing methods in combination with hardware of the processor 902.

Optionally, the filter entry is created by the switch when the switch receives a first data packet of the data stream, a characteristic value of the first data packet is filled in a match domain field of the filter entry, and the characteristic value is used to identify another data packet of the data stream.

Optionally, the processor 902 is further configured to determine a duration value for sending the report message to the controller, and fill the duration value in a duration field of the filter entry; when the rate value is less than or equal to the rate threshold, determine whether the duration value is greater than a preset maximum duration value; and when the duration is greater than the preset maximum duration, change the state field of the filter entry to the suspected attack stream state.

Optionally, the processor 902 is further configured to determine a traffic value for sending the report message to the controller, and fill the traffic value in a traffic field of the filter entry; when the duration is less than or equal to the preset maximum duration, determine whether the traffic value is greater than a preset traffic threshold; and when the traffic value is greater than the preset traffic threshold, change the state field of the filter entry to the suspected attack stream state; or when the traffic value is less than or equal to the preset traffic threshold, change the state field of the filter entry to the non-attack stream state.

Optionally, the transmitter 903 is further configured to, when the state field of the filter entry is changed to the suspected attack stream state, send the suspected attack stream state to the controller; the receiver 901 is further configured to receive a decision result returned by the controller; and the processor 902 is further configured to determine, according to the decision result, whether to change the state field of the filter entry.

Optionally, the processor 902 is further configured to, when the state field of the filter entry is the suspected attack stream state, reduce a rate for sending the report message to the controller.

Optionally, the processor 902 is further configured to, when the state field is the attack stream state, discard a subsequent data packet of the data stream.

Different from the prior art, in this implementation manner, an invalid stream filter table is created in a switch, if for a data stream, a rate value for sending, by the switch, a report message is greater than a rate threshold of the data stream, a state field corresponding to the data stream is set to an attack stream state, and when receiving another packet of the data stream, the switch may directly discard an attack packet and does not send the report message any longer, thereby preventing a broadcast storm caused by an attack stream. When the rate value for sending the report message is less than or equal to the rate threshold, it is further determined whether traffic for sending, by the switch, the report message to the controller exceeds a traffic threshold within maximum duration. If a determining result is that the traffic for sending, by the switch, the report message to the controller exceeds the traffic threshold within the maximum duration, or the traffic does not exceed the traffic threshold within the maximum duration but a duration for sending the report message exceeds the maximum duration, after the maximum duration is exceeded, the state field is set to a suspected attack stream state, and a rate at which the switch sends the report message to the controller is reduced, thereby reducing impact of an amplification effect. In addition, after the switch sends the suspected attack stream state to the controller, if a decision result returned by the controller is that the attack stream state is confirmed, the state field is changed from the suspected attack stream state to the attack stream state, and when receiving another attack packet of the data stream, the switch may directly discard the attack packet and does not send the report message, thereby preventing a broadcast storm caused by the attack stream; or if a decision result returned by the controller is that a non-attack stream state is confirmed, the state field is changed from the suspected attack stream state to the non-attack stream state, and when receiving another packet of the data stream, the switch does not need to monitor the data stream any longer, thereby increasing the processing efficiency to a normal rate.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes any medium that can store program code, such as a universal serial bus (USB) flash drive, a removable hard disk, a read-only memory (ROM), a random access memory (RAM), a magnetic disk, or an optical disc.

What is claimed is:

1. An attack stream identification method on a software defined network, wherein the software defined network comprises a switch and a controller, wherein an invalid stream filter table is stored in the switch, and wherein the attack stream identification method comprises:
   receiving, by the switch, a data packet of a data stream;
   searching, according to a characteristic value of the data packet, the invalid stream filter table for a state field of a filter entry corresponding to the data stream;
   sending, by the switch, a report message to the controller when the state field is a suspected attack stream state or a non-attack stream state;
   filling, by the switch, a rate value for sending the report message to the controller in a rate field of the filter entry; and
   changing, by the switch, the state field of the filter entry to an attack stream state when the rate value is greater than a preset rate threshold.

2. The method of claim 1, wherein the filter entry is created by the switch when the switch receives a first data packet of the data stream, wherein a characteristic value of the first data packet is filled in a match domain field of the filter entry, and wherein the characteristic value is used to identify another data packet of the data stream.

3. The method of claim 1, further comprising:
   filling, by the switch, a duration value for sending the report message to the controller in a duration field of the filter entry;
   determining, by the switch, Whether the duration value is greater than a preset maximum duration value when the rate value is less than or equal to the preset rate threshold; and
   changing, by the switch, the state field of the filter entry to the suspected attack stream state when the duration value is greater than the preset maximum duration value.

4. The method of claim 3, further comprising:
   filling, by the switch, a traffic value for sending the report message to the controller in a traffic field of the filter entry;
   determining, by the switch, whether the traffic value is greater than a preset traffic threshold when the duration value is less than or equal to the preset maximum duration value;
   changing, by the switch, the state field of the filter entry to the suspected attack stream state when the traffic value is greater than the preset traffic threshold; and
   changing, by the switch, the state field of the filter entry to the non-attack stream state when the traffic value is less than or equal to the preset traffic threshold.

5. The method of claim 4, further comprising:
   sending, by the switch, the suspected attack stream state to the controller when the state field of the filter entry is changed to the suspected attack stream state;
   receiving, by the switch, a decision result returned by the controller; and
   determining, according to the decision result, whether to change the state field of the filter entry.

6. The method of claim 5, further comprising reducing, by the switch, a rate for sending the report message to the controller when the state field of the filter entry is the suspected attack stream state.

7. The method of claim 1, further comprising discarding, by the switch, a subsequent data packet of the data stream when the state field is the attack stream state.

8. An attack stream identification apparatus on a software defined network, comprising:
  a receiver;
  a transmitter;
  a memory storing executable instructions; and
  a processor coupled to the memory, the receiver, and the transmitter,
  wherein the receiver is configured to:
    receive a data packet of a data stream;
    search, according to a characteristic value of the data packet, an invalid stream filter table for a state field of a filter entry corresponding to the data stream; and
    send the state field to the transmitter,
  wherein the transmitter is configured to:
    receive the state field; and
    send a report message to a controller when the state field is a suspected attack stream state or a non-attack stream state,
  wherein the processor is configured to:
    fill a rate value for sending the report message to the controller in a rate field of the filter entry;
    receive the rate value; and
    change the state field of the filter entry to an attack stream state when the rate value is greater than a preset rate threshold.

9. The apparatus of claim 8, wherein the filter entry is created by a switch when the switch receives a first data packet of the data stream, wherein a characteristic value of the first data packet is filled in a match domain field of the filter entry, and wherein the characteristic value is used to identify another data packet of the data stream.

10. The apparatus of claim 9, wherein the processor is further configured to:
  fill a duration value for sending the report message to the controller in a duration field of the filter entry;
  determine whether the duration value is greater than a preset maximum duration value when the rate value is less than or equal to the preset rate threshold; and
  change the state field of the filter entry to the suspected attack stream state when the duration value is greater than the preset maximum duration value.

11. The apparatus of claim 10, wherein the processor is further configured to:
  fill a traffic value for sending the report message to the controller in a traffic field of the filter entry;
  determine whether the traffic value is greater than a preset traffic threshold when the duration value is less than or equal to the preset maximum duration value; and
  change the state field of the filter entry to the non-attack stream state when the traffic value is less than or equal to the preset traffic threshold.

12. The apparatus of claim 11, wherein the transmitter is further configured to send the suspected attack stream state to the controller when the state field of the filter entry is changed to the suspected attack stream state, and wherein the receiver is further configured to:
  receive a decision result returned by the controller; and
  determine, according to the decision result, whether to change the state field of the filter entry.

13. The apparatus of claim 12, wherein the processor is further configured to reduce a rate for sending the report message to the controller when the state field of the filter entry is the suspected attack stream state.

14. The apparatus of claim 8, wherein the processor is further configured to discard a subsequent data packet of the data stream when the state field is the attack stream state.

15. A switch, comprising:
  a receiver configured to;
    receive a data packet of a data stream, and
    search, according to a characteristic value of the data packet, an invalid stream filter table for a state field of a filter entry corresponding to the data stream;
  a transmitter configured to send a report message to a controller when the state field is a suspected attack stream state or a non-attack stream state; and
  a processor coupled to the receiver and the transmitter and configured to:
    store the invalid stream filter table;
    fill a rate value for sending the report message to the controller in a rate field of the filter entry; and
    change the state field of the filter entry to an attack stream state when the rate value is greater than a preset rate threshold.

16. The switch of claim 15, wherein the filter entry is created by the switch when the switch receives a first data packet of the data stream, wherein a characteristic value of the first data packet is filled in a match domain field of the filter entry, and wherein the characteristic value is used to identify another data packet of the data stream.

17. The switch of claim 16, wherein the processor is further configured to:
  fill a duration value for sending the report message to the controller in a duration field of the filter entry;
  determine whether the duration value is greater than a preset maximum duration value when the rate value is less than or equal to the preset rate threshold; and
  change the state field of the filter entry to the suspected attack stream state when the duration value is greater than the preset maximum duration value.

18. The switch of claim 17, wherein the processor is further configured to;
  fill a traffic value for sending the report message to the controller in a traffic field of the filter entry;
  determine whether the traffic value is greater than a preset traffic threshold when the duration value is less than or equal to the preset maximum duration value;
  change the state field of the filter entry to the suspected attack stream state when the traffic value is greater than the preset traffic threshold; and
  change the state field of the filter entry to the non-attack stream state when the traffic value is less than or equal to the preset traffic threshold.

19. The switch of claim 18, wherein the transmitter is further configured to send the suspected attack stream state to the controller when the state field of the filter entry is changed to the suspected attack stream state, wherein the receiver is further configured to receive a decision result returned by the controller, and wherein the processor is further configured to determine, according to the decision result, whether to change the state field of the filter entry.

20. The switch of claim 19, wherein the processor is further configured to reduce a rate for sending the report message to the controller when the state field of the filter entry is the suspected attack stream state.

21. The switch of claim 15, wherein the processor is further configured to discard a subsequent data packet of the data stream when the state field is the attack stream state.

22. The switch of claim 15, wherein the processor is further configured to:
- fill a duration value for sending the report message to the controller in a duration field of the filter entry;
- determine whether the duration value is greater than a preset maximum duration value when the rate value is less than or equal to the preset rate threshold; and
- change the state field of the filter entry to the suspected attack stream state when the duration value is greater than the preset maximum duration value.

23. The switch of claim 17, wherein the transmitter is further configured to send the suspected attack stream state to the controller when the state field of the filter entry is changed to the suspected attack stream state, wherein the receiver is further configured to receive a decision result returned by the controller, and wherein the processor is further configured to determine, according to the decision result, whether to change the state field of the filter entry.

24. The switch of any claim 17, wherein the processor is further configured to reduce a rate for sending the report message to the controller when the state field of the filter entry is the suspected attack stream state.

25. The switch of claim 18, wherein the processor is further configured to reduce a rate for sending the report message to the controller when the state field of the filter entry is the suspected attack stream state.

* * * * *